(12) United States Patent
Hung

(10) Patent No.: US 7,999,430 B2
(45) Date of Patent: Aug. 16, 2011

(54) COMPLEMENTARY PERMANENT MAGNET STRUCTURE CAPABLE OF MINIMIZING COGGING TORQUE FOR ROTATING ELECTRIC MACHINE

(75) Inventor: Shih-Wei Hung, Taipei (TW)

(73) Assignee: Industrial Technology Research Institute, Hsin-Chu (TW)

( * ) Notice: Subject to any disclaimer, the term of this patent is extended or adjusted under 35 U.S.C. 154(b) by 217 days.

(21) Appl. No.: 12/400,355

(22) Filed: Mar. 9, 2009

(65) Prior Publication Data

US 2010/0156227 A1    Jun. 24, 2010

(30) Foreign Application Priority Data

Dec. 19, 2008   (TW) ................................ 97149678 A

(51) Int. Cl.
*H02K 21/12* (2006.01)
(52) U.S. Cl. ............................. 310/156.38; 310/156.45
(58) Field of Classification Search ............. 310/156.38, 310/156.39–156.45
See application file for complete search history.

(56) References Cited

U.S. PATENT DOCUMENTS

| | | | | |
|---|---|---|---|---|
| 4,642,502 A * | 2/1987 | Carpenter et al. | ........ | 310/156.12 |
| 5,302,876 A * | 4/1994 | Iwamatsu et al. | ........ | 310/156.12 |
| 5,355,044 A * | 10/1994 | Uchida et al. | ................. | 310/162 |
| 5,397,951 A * | 3/1995 | Uchida et al. | ............. | 310/156.21 |
| 5,744,894 A * | 4/1998 | Cho et al. | ................. | 310/156.38 |
| 6,252,323 B1 * | 6/2001 | Nishikawa et al. | ...... | 310/156.01 |
| 6,707,209 B2 * | 3/2004 | Crapo et al. | ............. | 310/156.43 |
| 6,867,524 B2 * | 3/2005 | Liang | ........................ | 310/156.47 |
| 7,245,054 B1 * | 7/2007 | Walls et al. | .............. | 310/156.25 |
| 2005/0017587 A1 * | 1/2005 | Koenig | .................... | 310/156.19 |
| 2006/0055266 A1 * | 3/2006 | Iwami et al. | ............. | 310/156.47 |
| 2006/0244335 A1 * | 11/2006 | Miyazaki et al. | ............. | 310/216 |
| 2007/0018522 A1 * | 1/2007 | Ackva et al. | ............. | 310/156.46 |
| 2007/0205689 A1 * | 9/2007 | Nemoto et al. | .......... | 310/156.47 |

FOREIGN PATENT DOCUMENTS

| | | |
|---|---|---|
| CN | 1497818 | 5/2004 |
| JP | 63129835 A * | 6/1988 |
| JP | 01206859 A * | 8/1989 |
| JP | 2002058218 | 2/2002 |

OTHER PUBLICATIONS

State Intellectual Property Office of the People's Republic of China, "Office Action", Mar. 24, 2011, China.

* cited by examiner

*Primary Examiner* — Quyen Leung
*Assistant Examiner* — Alex W Mok
(74) *Attorney, Agent, or Firm* — WPAT, PC; Justin King

(57) ABSTRACT

A complementary permanent magnet structure capable of minimizing the cogging torque for a rotating electric machine, the complementary permanent magnet structure comprising: a magnetic pole core being cylinder shaped with even numbered arc-shaped magnetic sets positioned with equal distances on the circumference thereof, each magnetic set being composed of a first permanent magnet unit and a second permanent magnet unit; and an armature core being ring shaped with a plurality of slots; wherein the ratio of the number of the slots to the number of magnetic poles of the magnetic pole core is 3/2; wherein the first permanent magnet unit and the second permanent magnet unit are positioned correspondingly to generate two complementary cogging torques with 180 degrees of electrical angle difference.

3 Claims, 14 Drawing Sheets

COMPLEMENTARY PERMANENT MAGNET STRUCTURE CAPABLE OF MINIMIZING COGGING TORQUE FOR ROTATING ELECTRIC MACHINE

FIELD OF THE INVENTION

The present invention generally relates to a permanent magnet structure for an electric machine and, more particularly, to a complementary permanent magnet structure capable of minimizing the cogging torque for a rotating electric machine such as an electric motor or a power generator.

BACKGROUND OF THE INVENTION

In order to enhance the efficiency, increase the power density and minimize the relative size of a rotating electric machine (such as an electric motor and a power generator), a permanent magnet is used as a constant magnetic source. With the development in processing and materials, the permanent magnet with high magnetic energy product is widely used in rotating electric machines.

When a permanent magnet is used as a constant magnetic source rotating without a load, the characteristics in the magnetic flux path of the rotating electric machine are controlled by the constant magnetic field. During rotation, the equivalent magnetic reluctance in the magnetic flux path changes periodically based on the rotating angle. A magnetic reluctance torque, also referred to as stop torque, is caused due to the rate of change of the magnetic reluctance in response to the rotating angle and is proportional to the square of the equivalent magnetic flux in the air gap. The torque generated by the constant magnetic field from the permanent magnet in order to match the minimum equivalent magnetic reluctance in the magnetic flux path of the core is referred to as a cogging torque.

When the driving torque is not much larger than the cogging torque, an undesired output torque ripple is generated to cause vibration and noise and further affect the control precision, especially when rotating at a very low rate. The cogging torque in a rotating electric machine is expressed as:

$$T_{cog} = -\frac{1}{2}\phi^2 \frac{dR_{mag}}{d\theta}$$

wherein $T_{cog}$ is the cogging torque; $\phi$ is the equivalent magnetic flux in the air gap; $R_{mag}$ is the equivalent magnetic reluctance in the magnetic flux path; and $\theta$ is the rotating angle.

The change of equivalent magnetic reluctance in the magnetic flux path can be expressed as a periodical function of the rotating angle. Accordingly, the cogging torque is the equivalent magnetic reluctance in the magnetic flux path differentiated by the rotating angle. Alternatively, the cogging torque can also be expressed as a symmetric period function of the rotating angle, which can be expressed in Fourier series.

To minimize the effect of the cogging torque on the rotating electric machine, two methods can be used. The first method is to reduce the equivalent magnetic flux in the air gap. The output cogging torque is proportional to the square of the equivalent magnetic flux in the air gap and the equivalent magnetic flux in the air gap is proportional to the effective output magnetic torque. Reducing the equivalent magnetic flux in the air gap does not only minimize the cogging torque but also reduce the effective output magnetic torque. Therefore, such a method is seldom used to minimize the cogging torque.

The second method is to reduce the rate of change of the equivalent magnetic reluctance in the magnetic flux path in response to the rotating angle. Ideally, as long as the equivalent magnetic reluctance in the magnetic flux path is kept constant during rotation (that is to say, the rate of change is zero), no cogging torque will be generated. Related designs concerning the reduction of the rate of change of the equivalent magnetic reluctance in the magnetic flux path in response to the rotating angle are capable of preventing negative influences on the effective output magnetic torque and other characteristics of the rotating electric machine. Therefore, such a method is often used to minimize the cogging torque.

There are many factors that cause the equivalent magnetic reluctance in the magnetic flux path to change. Mainly, the change of the magnetic flux path due to the relative rotating movement between the tooth slot structure of the armature core disposed for accommodating the winding and the magnetic pole core causes the change of the equivalent magnetic reluctance in the magnetic flux path. For example, the transition of the magnetic pole corresponding to the tooth, the magnetic reluctance in the air gap due to the slot opening, the change of the magnetic flux intensity and magnetic saturation directly or indirectly cause the change of the equivalent magnetic reluctance in the magnetic flux path, leading to the cogging torque.

To eliminate the change of the equivalent magnetic reluctance in the magnetic flux path, a skew tooth slot or a skew magnetic pole can be used to select one from the tooth slot of the armature and the magnetic pole of the permanent magnet to generate a phase shift due to the change of the axial magnetic reluctance by continuously or piecewise rotating a specific angle so that the total change of the magnetic reluctance is reduced, leading to a reduced total cogging torque. However, such a method using skew rotation results in increased cost and time in manufacturing, assembly and inspection.

Alternatively, the cogging torque can be reduced by using a specific ratio of the amount of slots to the amount of magnetic poles. Generally, the larger the lowest common multiple of the amount of slots and the amount of magnetic poles, the smaller the cogging torque. Using such a specific ratio, restricted windings are required and, sometimes, undesired radial forces occur. For example, for a rotating electric machine comprising 9 slots and 8 magnetic poles, a radial force occurs for such a slot-to-pole ratio, which causes radial loading on the bearing and leads to vibration and noise. Therefore, such a method is not suitable for low-vibration and low-noise applications.

Alternatively, a rotating electric machine can comprise multiple magnetic pole cores or multiple armature cores to reduce the cogging torque. The multiple magnetic pole cores or multiple armature cores are used to cause two cogging torques with the same intensity and an electrical angle different of 180 degrees so as to balance off the cogging torque during rotation. However, such a design is only useful for a rotating electric machine really requiring multiple magnetic pole cores or multiple armature cores. Moreover, such a design results in increased cost and time in manufacturing, assembly and inspection.

Alternatively, another method is to reduce the change of the total equivalent magnetic reluctance by changing the surface or internal structure of the tooth shoe of the armature core for adjacent air gaps or changing the surface or internal structure of the magnetic pole for adjacent air gaps. For example, the number of the slots on the tooth shoe surface can be increased to enlarge the surface arc. Alternatively, the tooth shoe can comprise materials with different permeability. Alternatively, the arc of the surface-mounted magnet can be changed. Alternatively, the magnetic pole can comprise materials with different permeability. All these approaches can suppress the change of the total equivalent magnetic reluctance.

Therefore, it is crucial to minimize the cogging torque for a rotating electric machine with ordinary manufacturing processing without additional manufacturing cost and time.

SUMMARY OF THE INVENTION

It is an object of the present invention to provide to a complementary permanent magnet structure capable of minimizing the cogging torque for a rotating electric machine such as an electric motor or a power generator.

In order to achieve the foregoing object, the present invention provides a complementary permanent magnet structure capable of minimizing the cogging torque for a rotating electric machine, the complementary permanent magnet structure comprising:

a magnetic pole core being cylinder shaped with even numbered arc-shaped magnetic sets positioned with equal distances on the circumference thereof, each magnetic set being composed of a first permanent magnet unit and a second permanent magnet unit; and an armature core being ring shaped with a plurality of slots;

wherein the ratio of the number of the slots to the number of magnetic poles of the magnetic pole core is 3/2;

wherein the first permanent magnet unit and the second permanent magnet unit are positioned correspondingly to generate two complementary cogging torques with 180 degrees of electrical angle difference so that the cogging torques are counterbalanced by adjusting the shapes and the sizes of the first permanent magnet unit and the second permanent magnet unit.

BRIEF DESCRIPTION OF THE DRAWINGS

The objects and spirits of several embodiments of the present invention will be readily understood by the accompanying drawings and detailed descriptions, wherein.

DETAILED DESCRIPTION OF THE PREFERRED EMBODIMENT

The present invention can be exemplified but not limited by various embodiments as described hereinafter.

Figure 1:
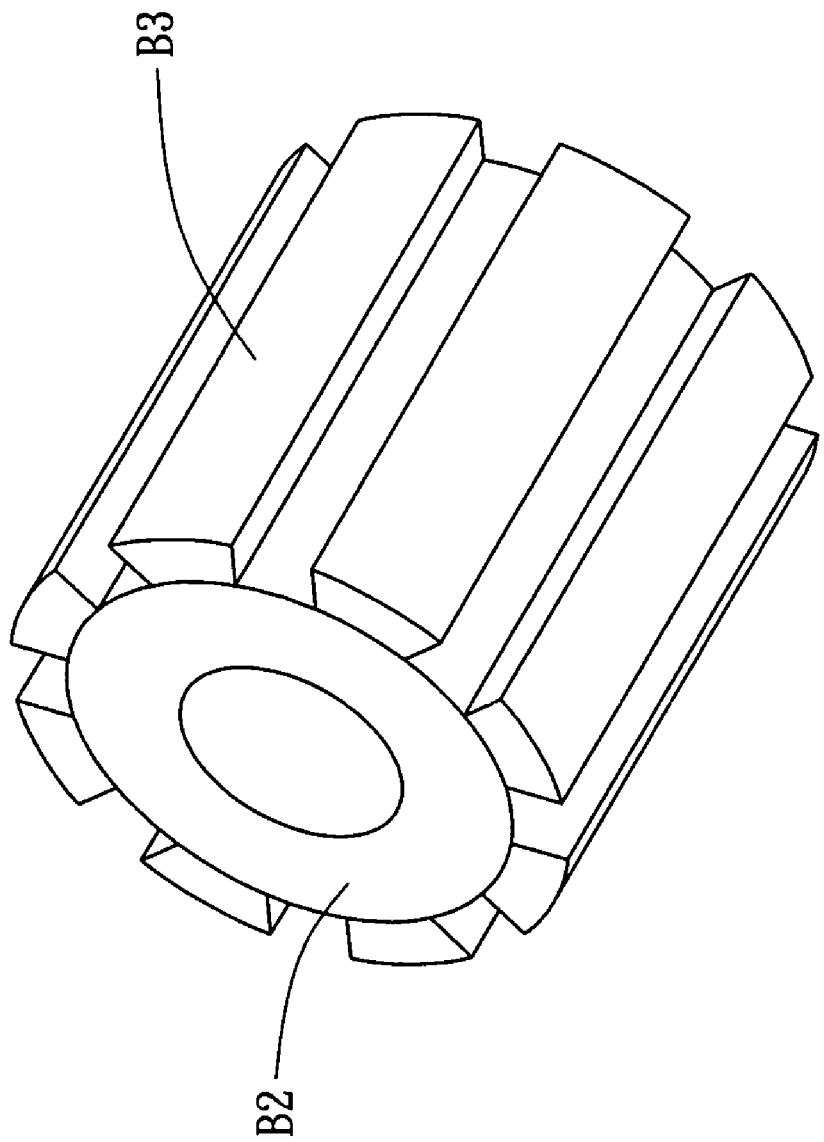
FIG. 1 is a 3-D view of a conventional magnetic pole core for a rotating electric machine.
Figure 2:
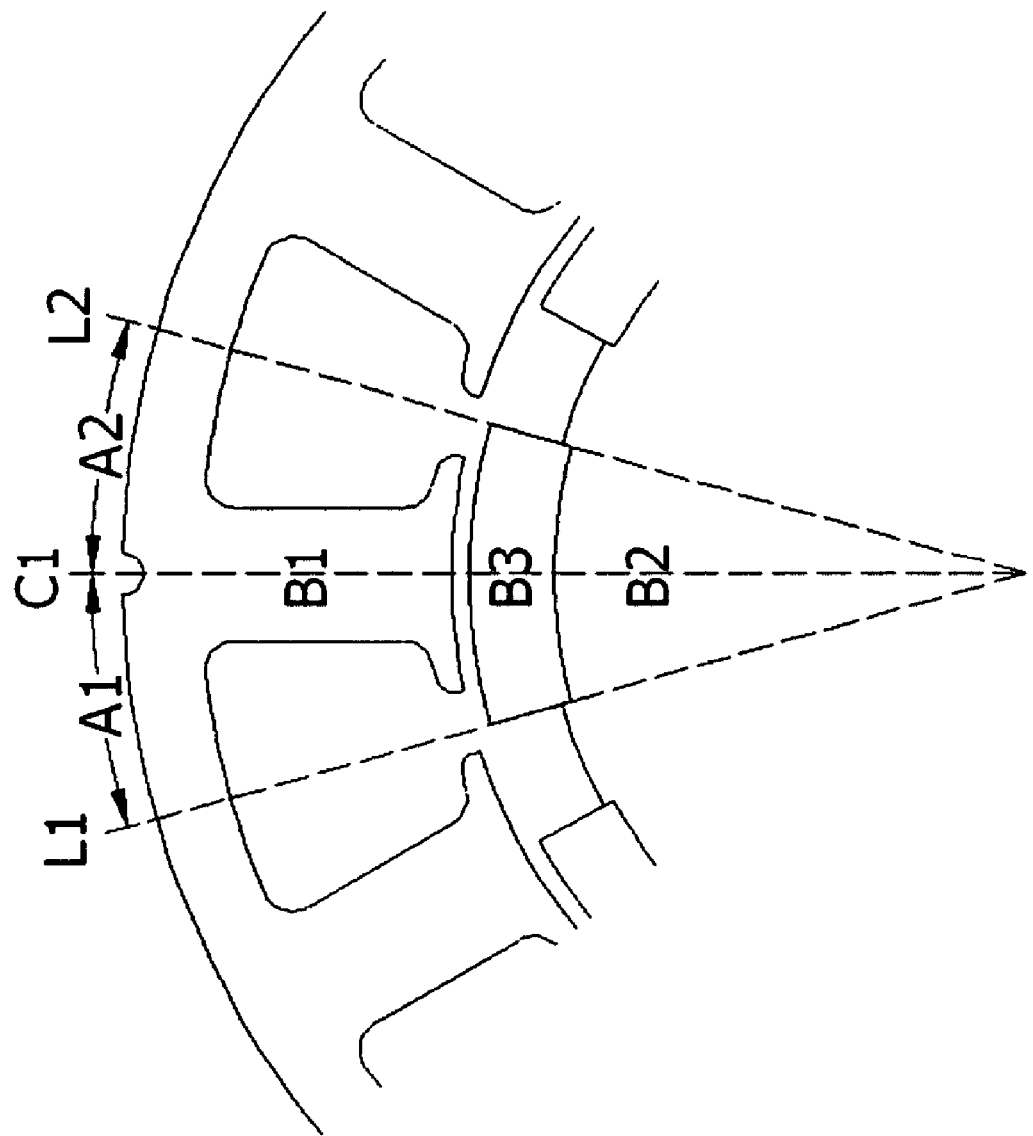
FIG. 2 is a cross-sectional view of a conventional rotating electric machine along a radial direction.
Figure 3:
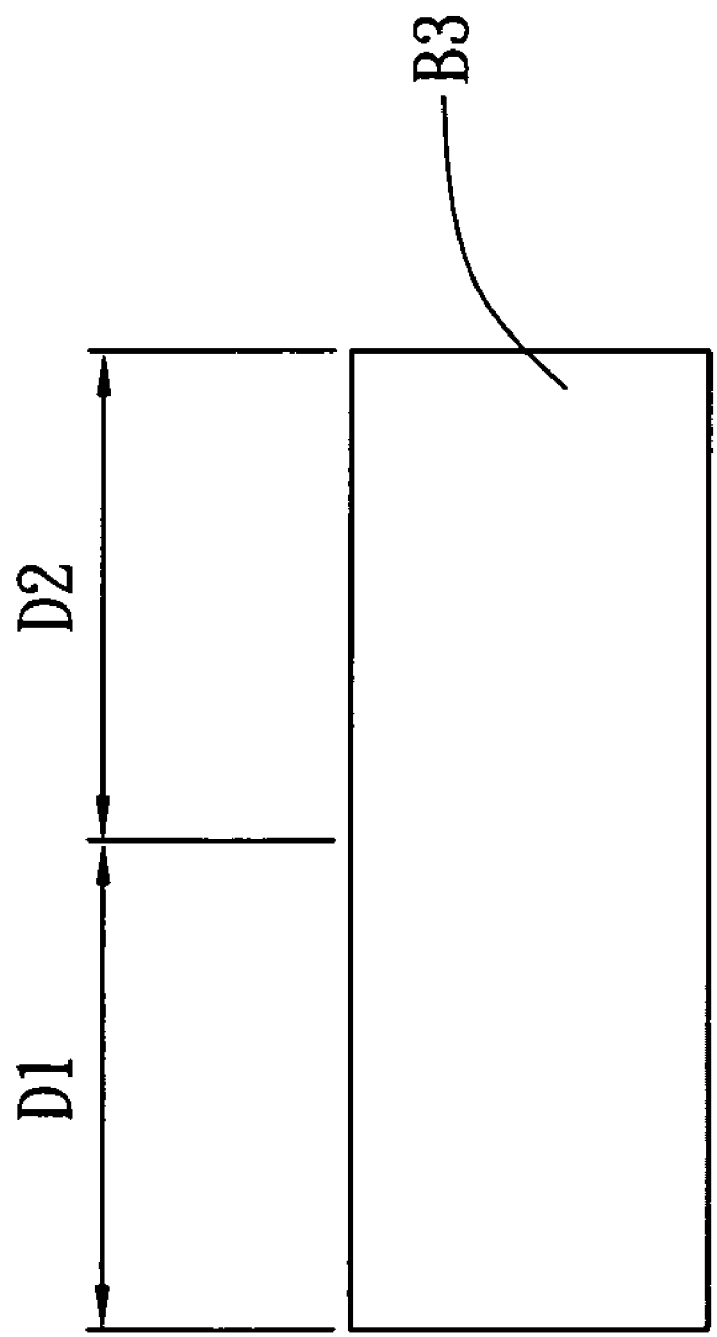
FIG. 3 is a cross-sectional view of a conventional permanent magnet for a rotating electric machine along an axial direction.

Please refer to FIG. 1, which is a 3-D view of a conventional magnetic pole core for a rotating electric machine. The magnetic pole core B2 is cylinder shaped with a plurality of arc-shaped permanent magnet sets B3 positioned with equal distances on the circumference thereof. As shown in FIG. 2, the permanent magnet set B3 between the reference lines L1, L2 corresponds to a central line C1. An expanding angle A1 is exhibited between the central line C1 and the reference line L1, while an expanding angle A2 is exhibited between the central line C1 and the reference line L2. The two expanding angles are identical, i.e., A1=A2. As shown in FIG. 3, the total thickness of the permanent magnet set B3 is D1+D2. Therefore, in this prior art, the expanding angle A1 and the expanding angle A2 are adjusted to obtain a desired cogging torque.

Figure 4A:
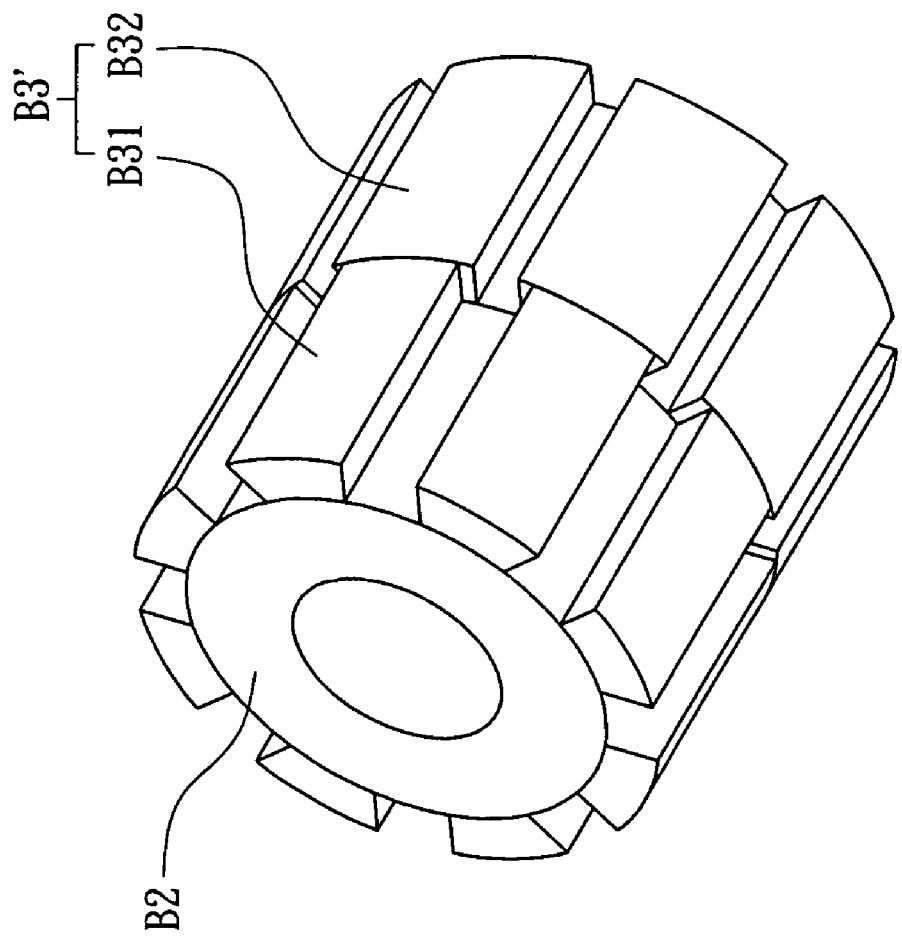
FIG. 4A is a 3-D view of a magnetic pole core for a rotating electric machine according to a first embodiment of the present invention.
Figure 4B:
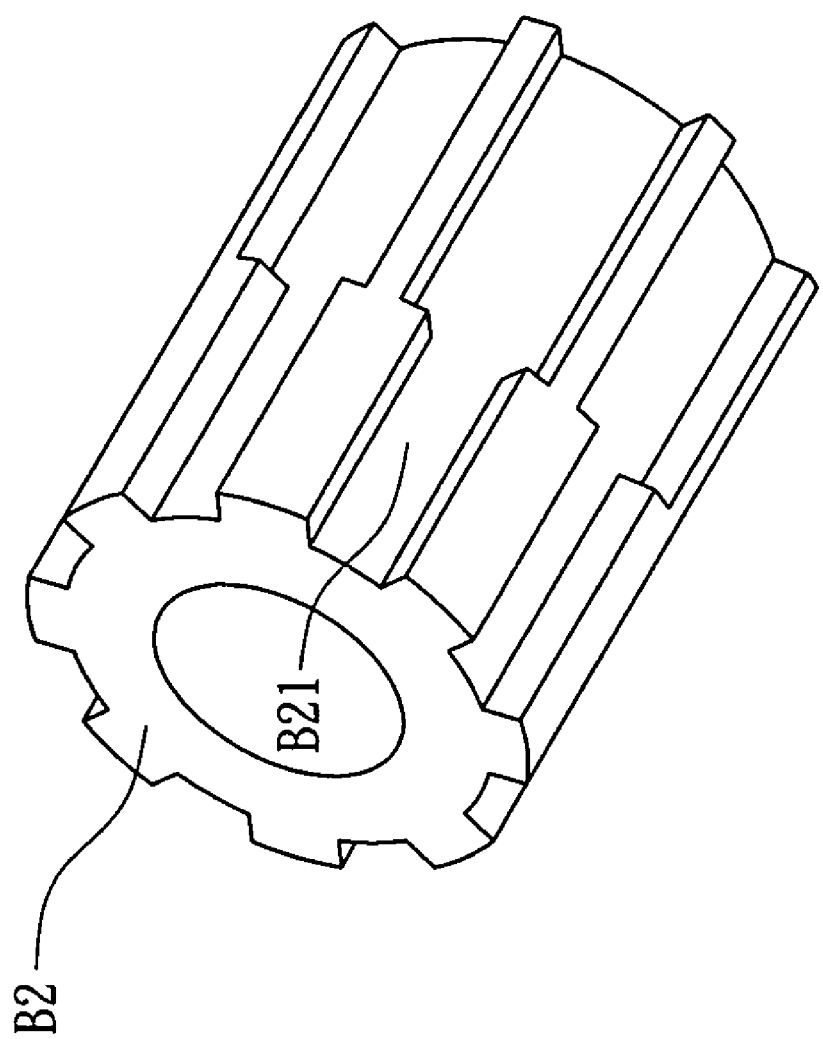
FIG. 4B is a 3-D view of a magnetic pole core for a rotating electric machine according to another first embodiment of the present invention.
Figure 5:
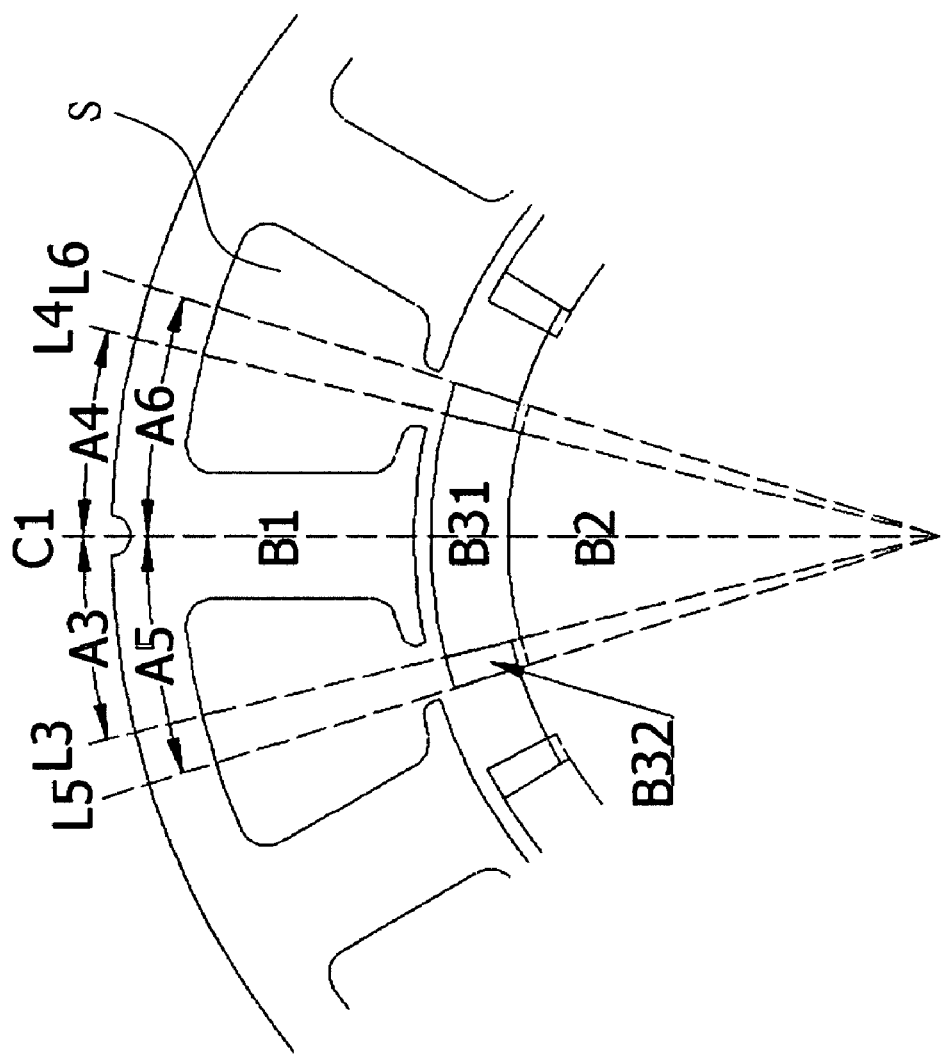
FIG. 5 is a cross-sectional view of a rotating electric machine along a radial direction according to a first embodiment of the present invention.

The complementary permanent magnet structure capable of minimizing the cogging torque for a rotating electric machine such as an electric motor or a power generator in the present invention is shown in FIG. 4A. The complementary permanent magnet structure comprises a magnetic pole core B2 and an armature core B1. The magnetic pole core B2 is cylinder shaped with even numbered arc-shaped magnetic sets B3' positioned with equal distances on the circumference thereof. Each magnetic set B3' is composed of a first permanent magnet unit B31 between the first reference lines L3, L4 and a second permanent magnet unit B32 between the second reference lines L5, L6, as shown in FIG. 5. The armature core B1 is ring shaped with a plurality of slots S. More particularly, the ratio of the number of the slots S to the number of magnetic poles of the magnetic pole core B2 is 3/2. Alternatively, in addition to FIG. 4A, the magnetic pole core B2 can be structured as in FIG. 4B. In FIG. 4B, the magnetic pole core B2 is provided with even numbered grooved slots B21 so as to accommodate the even numbered arc-shaped magnetic sets B3'.

Figure 6:
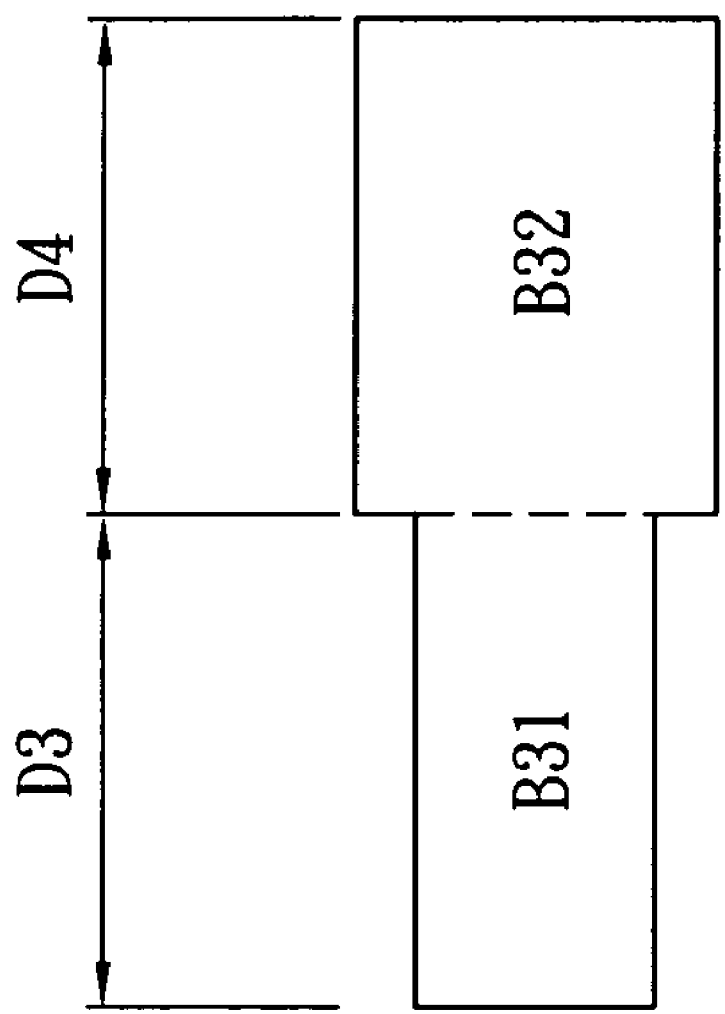
FIG. 6 is a cross-sectional view of a permanent magnet for a rotating electric machine along an axial direction according to a first embodiment of the present invention.

The first permanent magnet unit B31 positioned between the first reference lines L3, L4 corresponds to a central line C1. An expanding angle A3 is exhibited between the central line C1 and the reference line L3, and another expanding angle A4 is exhibited between the central line C1 and the reference line L4. The two expanding angles are identical, i.e., A3=A4. The total expanding angle (A3+A4) of the first permanent magnet set B31 is smaller than 360 degrees divided by the number of the slots S and the thickness of the first permanent magnet unit set B31 is D3, as shown in FIG. 5 and FIG. 6.

The second permanent magnet unit B32 positioned between the second reference lines L5, L6 corresponds to a central line C1. An expanding angle A5 is exhibited between the central line C1 and the reference line L5, and another expanding angle A6 is exhibited between the central line C1 and the reference line L6. The two expanding angles are identical, i.e., A5=A6. The total expanding angle (A5+A6) of the second permanent magnet unit set B32 is larger than 360 degrees divided by the number of the slots S and the thickness of the second permanent magnet unit set B32 is D4, as shown in FIG. 5 and FIG. 6.

Figure 7:
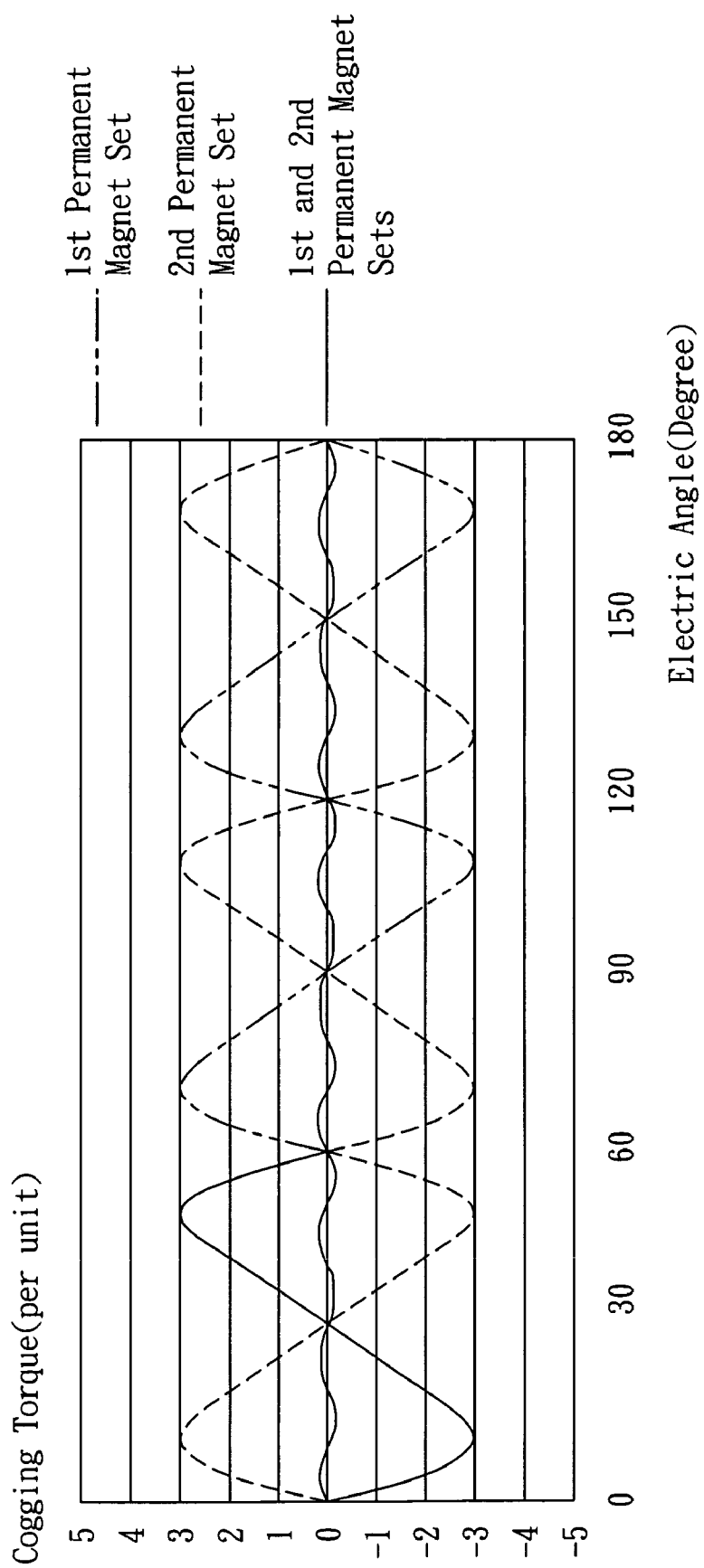
FIG. 7 shows comparison of cogging torque to expanding electrical angle relations of permanent magnets according to a first embodiment of the present invention.

The total expanding angle (A3+A4) of the first permanent magnet unit set B31 is smaller than 360 degrees divided by the number of the slots S, and the total expanding angle (A5+A6) of the second permanent magnet unit set B32 is larger than 360 degrees divided by the number of the slots S. Therefore, two cogging torques with similar waveforms and 180 degrees of electrical angle difference are determined. Moreover, the two cogging torques can be identical by adjusting the thickness D3 of the first permanent magnet unit B31 and the thickness D4 of the second permanent magnet unit B32. In other words, the two cogging torques can be counterbalanced to be minimized by the complementary permanent magnet structure, as shown in FIG. 7. In FIG. 7, comparison of cogging torque to expanding electrical angle relations of permanent magnets according to a first embodiment of the present invention is shown, wherein the cogging torque in the longitudinal axis is normalized and the rotating angle is expanded as 180 degree electric angle in the transversal axis.

For a rotating electric machine comprising 12 slots and 8 magnetic poles, in the first embodiment, the expanding angle (A3+A4) of the first permanent magnet unit set B31 is 27.6 degrees and the expanding angle (A5+A6) of the second permanent magnet unit set B32 is 35 degrees. The thickness D3 of the first permanent magnet unit set B31 is preferably equal to the thickness D4 of the second permanent magnet unit set B32. Therefore, the two cogging torques can be counterbalanced to be minimized by the complementary permanent magnet structure.

Figure 8:
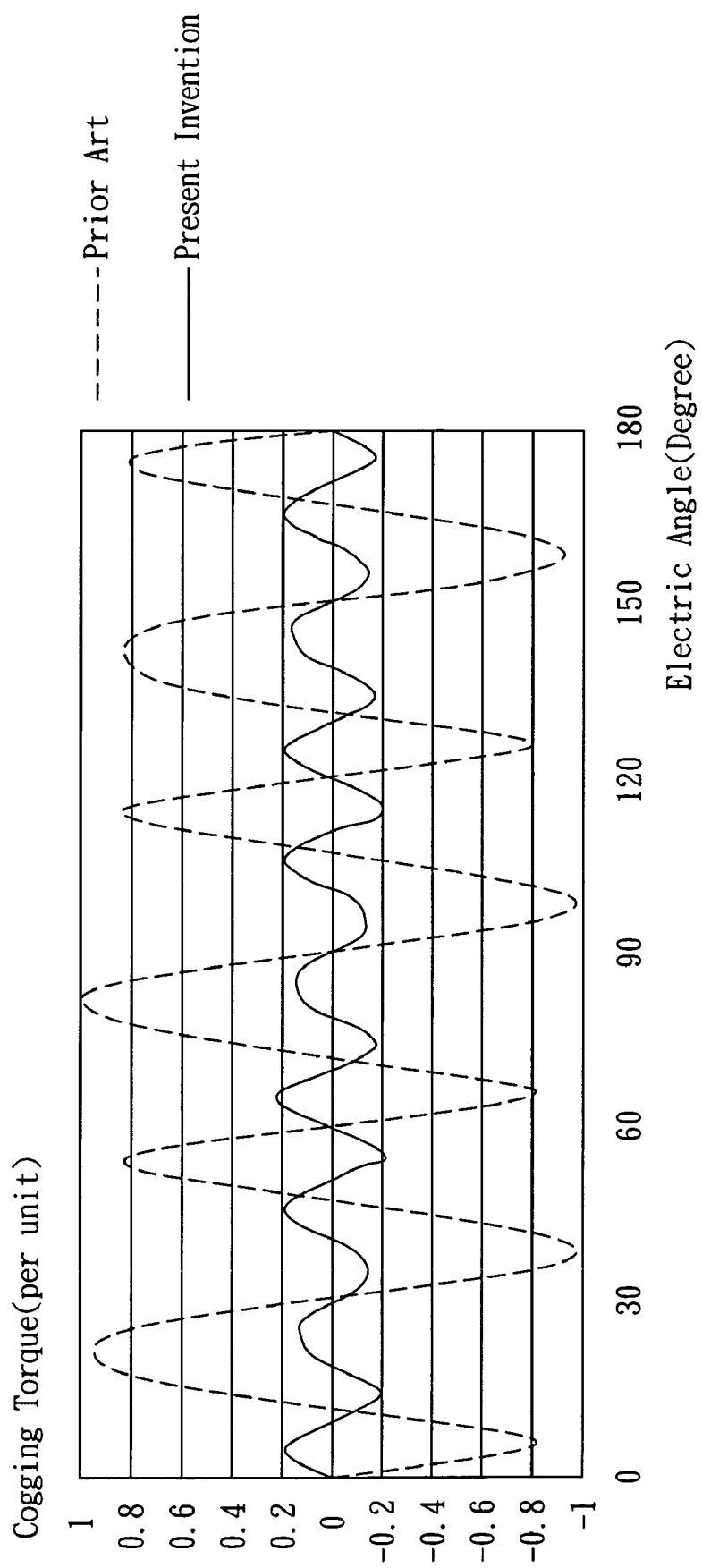
FIG. 8 shows comparison of cogging torque to expanding electrical angle relations of a first embodiment of the present invention and the prior art.

Please refer to FIG. 8, which shows comparison of cogging torque to expanding electrical angle relations of the first embodiment of the present invention and the prior art. In FIG. 8, the cogging torque in the longitudinal axis is normalized and the rotating angle is expanded as 180 degree electric angle in the transversal axis. In the present embodiment, the peak value of the cogging torque is reduced by 80% to achieve minimized cogging torque of the rotating electric machine.

Figure 9:
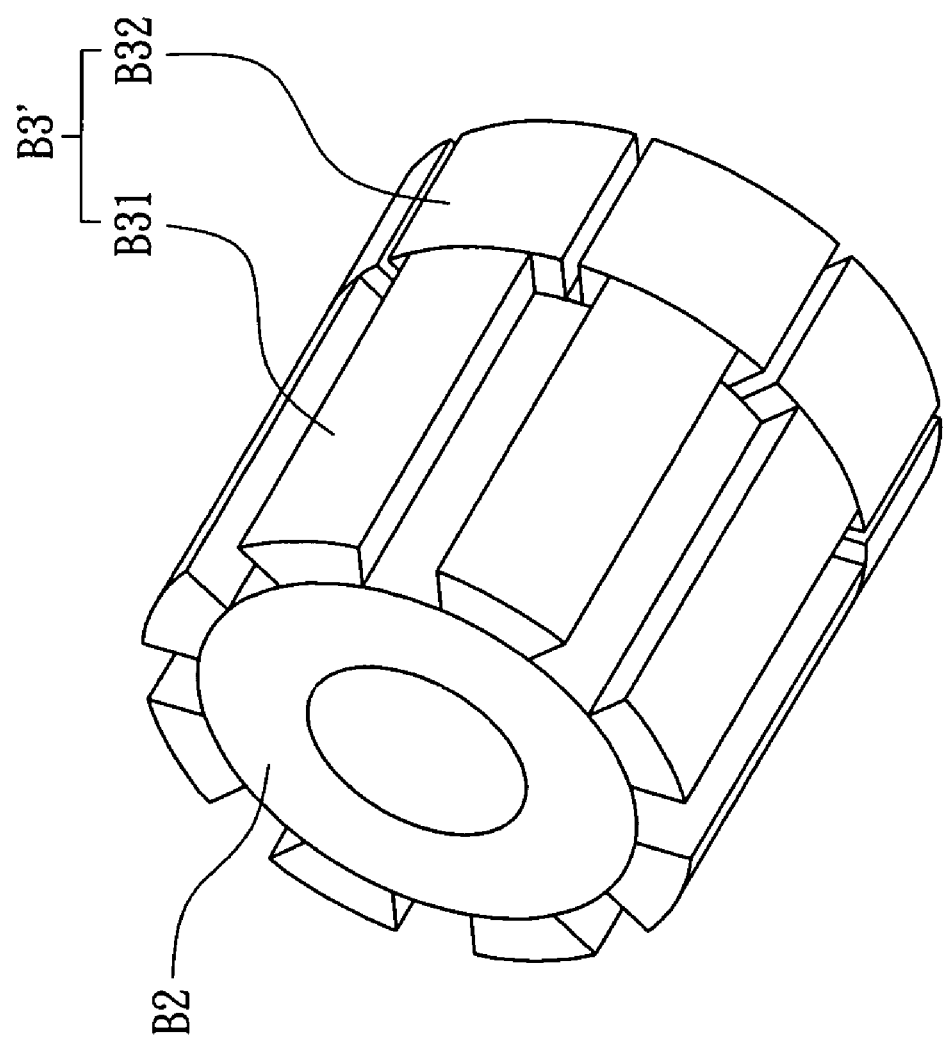
FIG. 9 is a 3-D view of a magnetic pole core for a rotating electric machine according to a second embodiment of the present invention.
Figure 10:
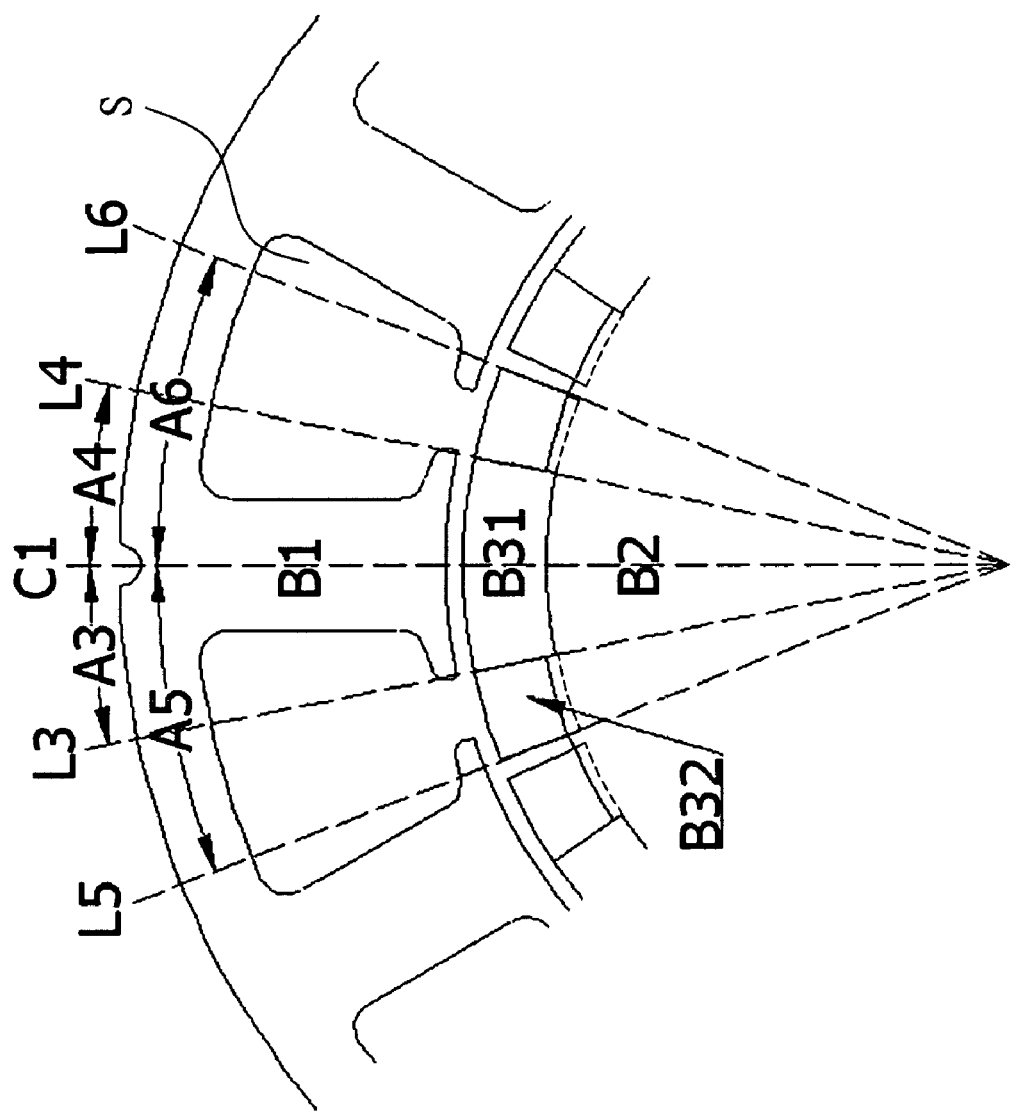
FIG. 10 is a cross-sectional view of a rotating electric machine along a radial direction according to a second embodiment of the present invention.
Figure 11:
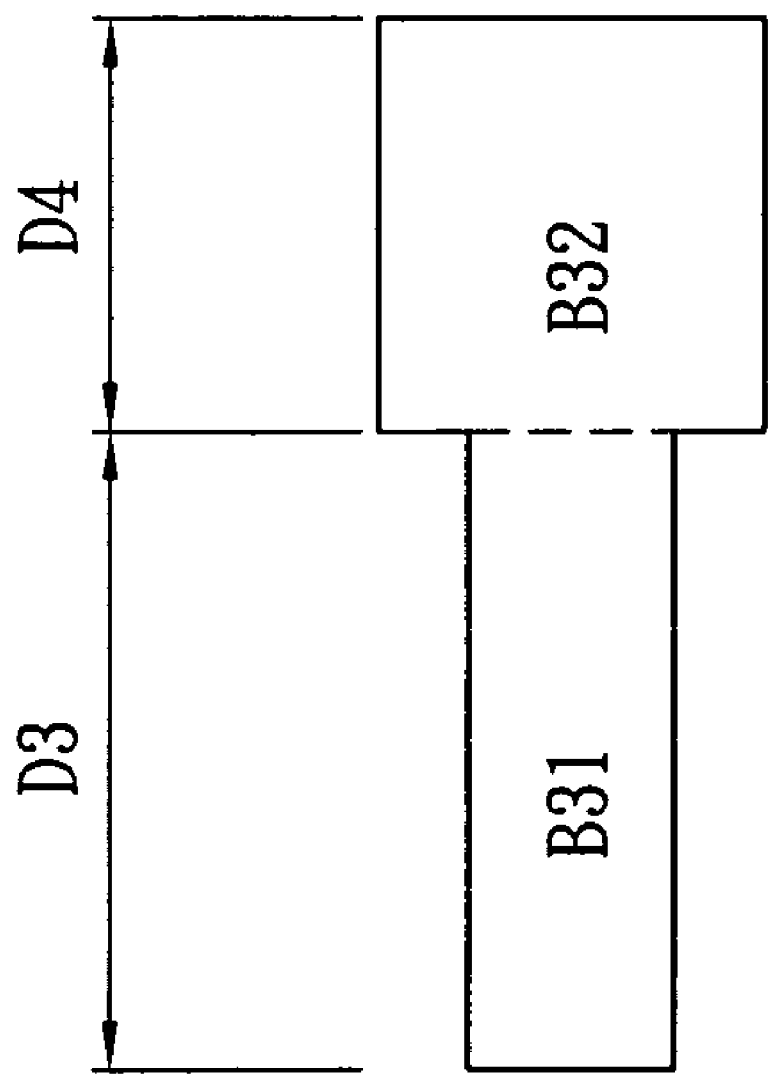
FIG. 11 is a cross-sectional view of a permanent magnet for a rotating electric machine along an axial direction according to a second embodiment of the present invention.
Figure 12:
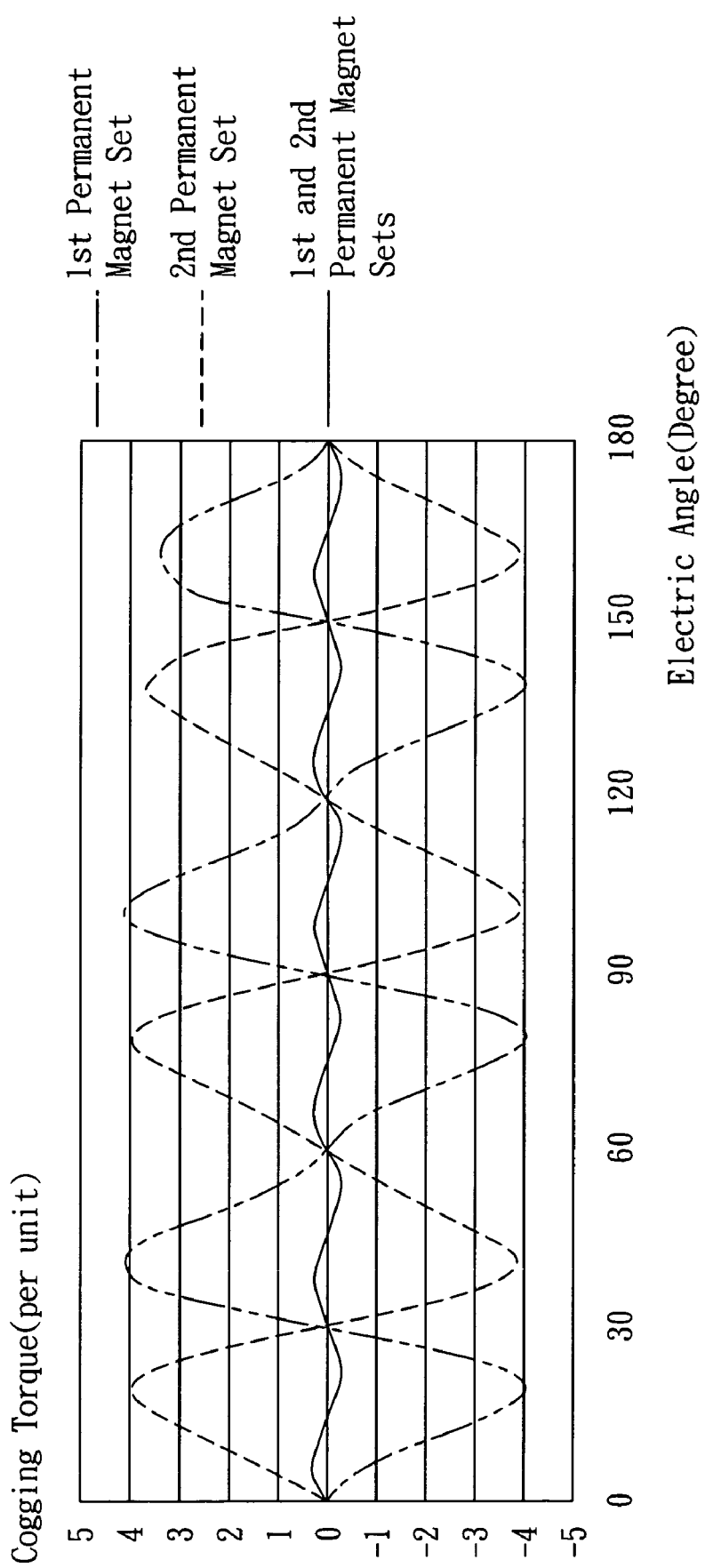
FIG. 12 shows comparison of cogging torque to expanding electrical angle relations of permanent magnets according to a second embodiment of the present invention.

In a second embodiment, a rotating electric machine comprising 12 slots and 8 magnetic poles as shown in FIG. 9 to FIG. 11. Similar to the first embodiment, the complementary permanent magnet structure composed of the first and the second permanent magnet unit sets B31, B32 in the second embodiment is as shown in FIG. 9. The second embodiment is different from the first embodiment in that the width and the length of the first and the second permanent magnet unit sets B31, B32 are changed. The expanding angle (A3+A4) of the first permanent magnet unit set B31 is 23 degrees and the expanding angle (A5+A6) of the second permanent magnet unit set B32 is 43 degrees, as shown in FIG. 10. The thickness D3 of the first permanent magnet unit set B31 is preferably larger than the thickness D4 of the second permanent magnet unit set B32, as shown in FIG. 11. Therefore, the two cogging torques can be counterbalanced to be minimized by the complementary permanent magnet structure, as shown in FIG. 12. In FIG. 12, comparison of cogging torque to expanding electrical angle relations of permanent magnets according to a second embodiment of the present invention is shown, wherein the cogging torque in the longitudinal axis is normalized and the rotating angle is expanded as 180 degree electric angle in the transversal axis.

Figure 13:
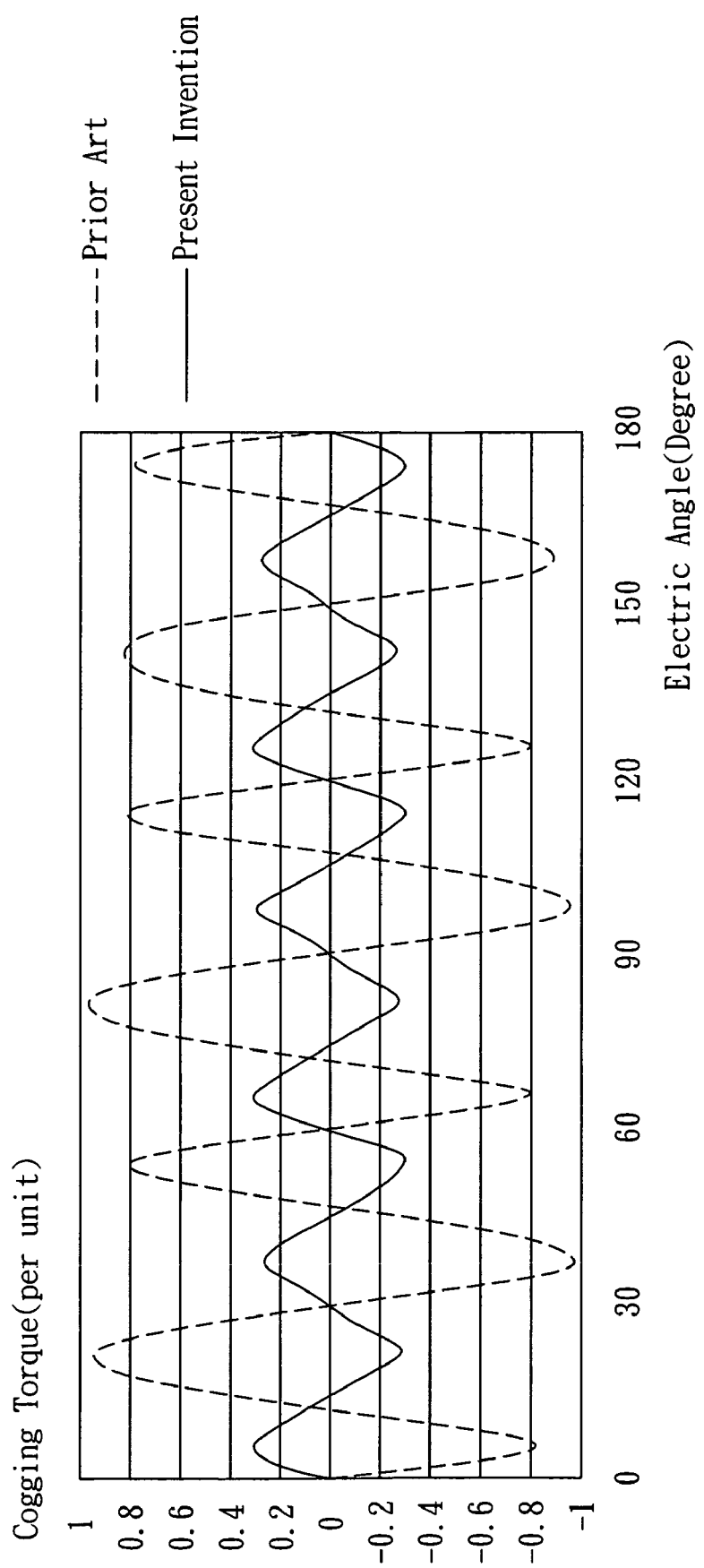
FIG. 13 shows comparison of cogging torque to expanding electrical angle relations of a second embodiment of the present invention and the prior art.

Please refer to FIG. 13, which shows comparison of cogging torque to expanding electrical angle relations of the second embodiment of the present invention and the prior art. In FIG. 13, the cogging torque in the longitudinal axis is normalized and the rotating angle is expanded as 180 degree electric angle in the transversal axis. In the present embodiment, the peak value of the cogging torque is reduced by 70% to achieve minimized cogging torque of the rotating electric machine.

Accordingly, the present invention discloses a complementary permanent magnet structure capable of minimizing the cogging torque for a rotating electric machine such as an electric motor or a power generator with ordinary manufacturing processing without additional manufacturing cost and time. Therefore, the present invention is novel, useful, and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A complementary permanent magnet structure capable of minimizing the cogging torque for a rotating electric machine, the complementary permanent magnet structure comprising:

a magnetic pole core being cylinder shaped with even numbered arc-shaped magnetic sets positioned with equal distances on the circumference thereof, each magnetic set being composed of a first permanent magnet unit and a second permanent magnet unit; and an armature core being ring shaped with a plurality of slots;

wherein the ratio of the number of the slots to the number of magnetic poles of the magnetic pole core is 3/2;

wherein the first permanent magnet unit and the second permanent magnet unit are positioned correspondingly to generate two complementary cogging torques with 180 degrees of electrical angle difference so that the cogging torques are counterbalanced by adjusting the shapes and the sizes of the first permanent magnet unit and the second permanent magnet unit; and wherein the dimension parallel to the axis of rotation of the first permanent magnet unit is greater than the dimension parallel to the axis of rotation of the second permanent magnet unit, and the width of the first permanent magnet unit is less than the second permanent magnet unit.

2. The complementary permanent magnet structure as recited in claim 1, wherein a central line of the first permanent magnet unit and a central line of the magnetic set are overlapped and the first permanent magnet unit exhibits a first expanding angle smaller than 360 degrees divided by the number of the slots.

3. The complementary permanent magnet structure as recited in claim 1, wherein a central line of the second permanent magnet unit and a central line of the magnetic set are overlapped and the second permanent magnet unit exhibits a second expanding angle larger than 360 degrees divided by the number of the slots.

* * * * *